United States Patent [19]

Fink et al.

[11] 4,074,283

[45] Feb. 14, 1978

[54] NON-MECHANICAL PRINTER OPERATING IN ACCORDANCE WITH AN ELECTROGRAPHIC PROCESS

[75] Inventors: Wolfgang Fink, Glonn; Peter Graf, Munich, both of Germany

[73] Assignee: Siemens Aktiengesellschaft, Berlin & Munich, Germany

[21] Appl. No.: 681,726

[22] Filed: Apr. 29, 1976

[30] Foreign Application Priority Data

May 5, 1975 Germany .......................... 2519997

[51] Int. Cl.$^2$ .......................................... G01D 15/06

[52] U.S. Cl. ............................ 346/139 C; 346/155; 346/165

[58] Field of Search ............... 346/139 C, 139 R, 165, 346/155; 360/103

[56] References Cited

U.S. PATENT DOCUMENTS

| | | | |
|---|---|---|---|
| 3,041,612 | 6/1962 | Woodcock | 360/103 X |
| 3,132,328 | 5/1964 | Taylor | 360/103 |
| 3,835,262 | 9/1974 | Moritz | 360/103 X |

*Primary Examiner*—Joseph W. Hartary

*Attorney, Agent, or Firm*—Hill, Gross, Simpson, Van Santen, Steadman, Chiara & Simpson

[57] ABSTRACT

A non-mechanical printer for use in an electrographic process comprising a drum-shaped data carrier, a recording head and a gas bearing for supporting the recording head on a cushion of gas in spaced relation to the data carrier. The data carrier is drum-shaped and the surfaces of the gas bearing which face the data carrier are correspondingly curved. The gas bearing includes porous walls for issuing pressurized gas toward the surface of the data carrier to produce the gas cushion.

2 Claims, 2 Drawing Figures

NON-MECHANICAL PRINTER OPERATING IN ACCORDANCE WITH AN ELECTROGRAPHIC PROCESS

BACKGROUND OF THE INVENTION

This invention relates generally to the field of electrostatic printing and more particularly to an improved non-mechanical printer for use in an electrographic printing process.

Mechanical printers are not suitable for printing at high speeds, e.g., more than 10,000 lines per minute. Instead, in connection with high speed printing, a number of processes employing non-mechanical printing, such as, for example, electrostatic printing, have been developed.

In the field of electrostatic printing it is desirable to distinguish between two processes: the electro-photographic process and the electrographic process. In the electro-photographic printing or recording process, a layer of photo-conductive material is uniformly charged with a positive charge by means of a corona discharge. The character or the like which is to be printed is then optically projected onto the photo-conductive material, as a result of which the material becomes conductive at the illuminated points and the previously existing positive charge disappears. The print is rendered visual with a colored powder (the toner) which is positively charged and which adheres to the discharged points, but is repelled by the non-illuminated, still-charged points of the data carrier.

In the electrographic process a data carrier composed of an insulating top layer and a conductive carrier layer is printed upon. During the printing process a charge image corresponding to the characters which are to be printed is applied to the data carrier by a corona discharge or the like. In this instance the charge of the insulating top layer may be positive, in which event the charge image is visualized by a negatively charged toner.

Hitherto electrographic printing processes have employed only coated paper, which is inevitably more expensive than uncoated, so-called normal paper. On the other hand, increased costs of material compel use of the cheapest possible paper in high speed printers.

Transfer printing processes can be used for printing on normal paper. In this process the data carrier is in the form of an intermediate carrier, e.g., a drum upon which the charge images are produced. After the charge images have been developed on the intermediate carrier, they are transferred to the normal paper and fixed. A so-called recording head is used to apply the charge images to the data carrier and can be of such known construction as, for example, an electrode comb.

In electrography it is important that the distance between the recording head and the data carrier be as short as possible. In addition the distance must be maintained as constant as possible. In previously known processes the special paper has been brought in contact with the electrographic recording head, as a consequence of which a minimum distance between the recording head and the data carrier has been produced. If, on the other hand, the transfer process is used, it is not possible to achieve such a small and constant distance between the recording head and the data carrier as a consequence of the lack of roundness of the intermediate carrier (for example, a drum), and as a result of the wear due to the contact between the recording head and the intermediate carrier.

An object of the present invention involves the provision of a non-mechanical printer in which the distance between the recording head and the data carrier is small and is maintained at a constant value. In accordance with the principles of the present invention this object is realized by virtue of a cushion of gas which is produced on the surface of the data carrier, the recording head floating on said cushion. With the aid of the gas flowing out of nozzles this cushion of gas between the recording head and the data carrier can be produced such that the distance between the data carrier and the recording head is approximately 10 $\mu$m.

Additional details and features of the present invention, along with other objects and advantages thereof, will be readily apparent from the following description of the preferred embodiment, taken in conjunction with the accompanying drawing, although variations and modifications may be effected without departing from the spirit and scope of the novel concepts disclosed herein.

DESCRIPTION OF THE PREFERRED EMBODIMENT

Figure 1:
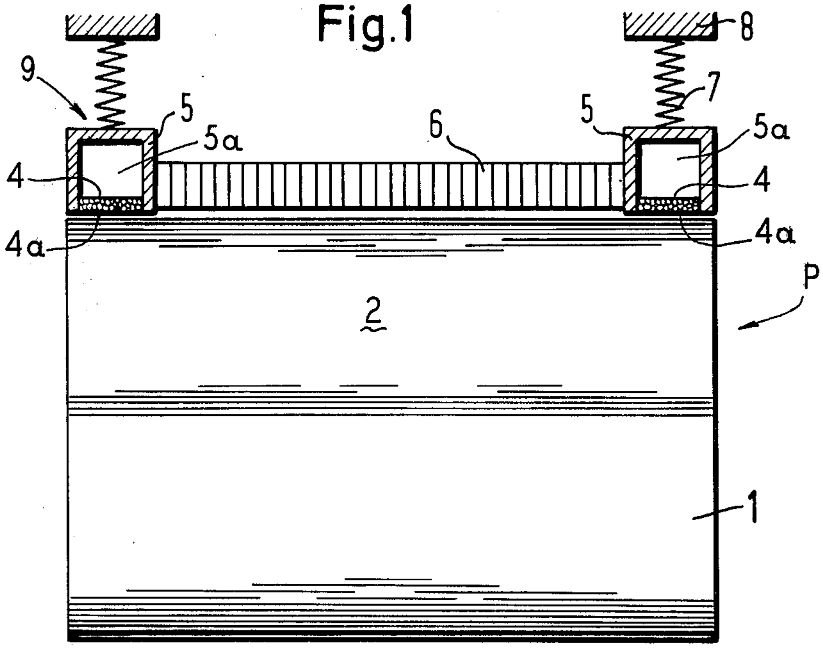
FIG. 1 is a somewhat diagrammatic elevational front view of a non-mechanical printer with portions shown in section.

FIG. 1 illustrates a non-mechanical printer constructed in accordance with the principles of the present invention and indicated generally at reference character P. The printer P is particularly adapted for use in a transfer electrographic printing process in which the printed material is ordinary or normal paper. A data carrier assumes the form of an intermediate carrier which comprises a drum 1. In the exemplary embodiment illustrated, a recording head comprises an electrode comb 6 of known construction which is connected to a gas bearing mechanism indicated generally at reference numeral 9.

The gas bearing mechanism 9 includes a pair of elongated enclosures or housings 5 which extend essentially transversely of the parallel axes of the drum 1 and the electrode comb 6.

The gas bearing mechanism 9 provides a cushion of gas (for example, air) between the electrode comb recording head 6 and the data carrier 1, and in operation the bearing mechanism 9 and the recording head which is connected thereto "floats" on this cushion of gas.

In order to provide the gas cushion, each of the enclosures 5 are provided with a gas inlet 3 for receiving a supply of gas under pressure. The gas is emitted from chambers 5*a* formed within the enclosures 5 through porous walls 4 which form part of the enclosures 5 and specifically that portion of the wall thereof which faces the surface of the data carrier 1.

Figure 2:
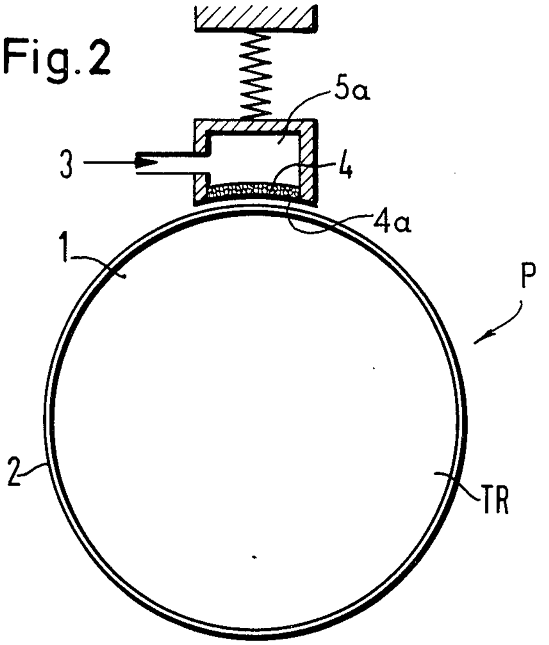
FIG. 2 is an end view of the structure shown in FIG. 1.

Referring to FIG. 2, the porous walls 4, and particularly the surfaces 4*a* thereof which are disposed in proximity to the outer surface of the drum 1, are curved and shaped complementarily to the cylindrical configuration of the drum 1.

The gas bearing mechanism 9 is, of course, movable with respect to the drum 1 and for that purpose the enclosures 5 are connected to a pair of holders or mounting brackets 8 by means of a pair of springs or other resilient members 7. The mounting brackets 8 are, of course, arranged by means not shown such that they remain in fixed assembly with respect to the axes of the drum 1.

In operation, the distance or gap between the recording head 6 and the data carrier 1 may be varied by varying the pressure of the gas being supplied through the gas inlet 3 to the chambers 5*a*. As the gas pressure increases the gap increases, and as the gas pressure decreases so does the gap decrease.

As will be understood by those skilled in the art, the recording head 6 is adjusted between the elongated or runner-like enclosures 5 in a manner such that an optimum gap, resulting from the known Paschen curve, is formed between the electrode peaks of the recording head 6 and the dielectric layer 2 formed on the drum 1.

In the illustrated embodiment, a cylindrical drum 1 has been utilized as the data carrier. It will be appreciated that other data carriers, such as strips, can be advantageously utilized as well. Furthermore, while the invention has been described in association with the transfer electrographic printing process, it is not limited thereto, and the concept of utilizing a gas bearing mechanism for the purpose of spacing the recording head can also be utilized in the direct electrographic printing of paper.

Although minor modifications might be suggested by those versed in the art, it should be understood that we wish to embody within the scope of the patent warranted hereon all such modifications as reasonably come within the scope of our contribution to the art.

We claim as our invention:

1. A non-mechanical printer for use in an electrographic process comprising a horizontally disposed rotatable drum-shaped data carrier, an elongated horizontally disposed electrode comb located above said data carrier, and gas bearing means on said recording head for maintaining said recording head in predetermined spaced relation to said data carrier, said gas bearing means comprising a pair of housings connected respectively to the ends of said recording head and in overlying relation to said data carrier, said housings each having a pressurized gas inlet, a gas chamber and a porous bottom wall in registry with said data carrier and shaped to the contour thereof.

2. The invention as defined in claim 1 and including means comprising a pair of mounting brackets and a corresponding pair of spring members interconnecting said mounting brackets and said housings for maintaining said recording head in location above said data carrier while permitting relative vertical movement thereof.

* * * * *